(12) United States Patent
Mix

(10) Patent No.: US 8,555,993 B2
(45) Date of Patent: Oct. 15, 2013

(54) MULTI-PURPOSE LANDSCAPING TOOL

(76) Inventor: Ryan Mix, Foley, MN (US)

( * ) Notice: Subject to any disclaimer, the term of this patent is extended or adjusted under 35 U.S.C. 154(b) by 310 days.

(21) Appl. No.: 13/065,600

(22) Filed: Mar. 25, 2011

(65) Prior Publication Data
US 2012/0241179 A1  Sep. 27, 2012

(51) Int. Cl.
*A01B 1/06* (2006.01)
(52) U.S. Cl.
USPC .............................................. 172/17; 56/239
(58) Field of Classification Search
USPC ............ 172/15–21, 371–378, 192, 198, 358, 172/354, 136; 56/239, 289, 400.01, 400.06, 56/400.05; 7/114, 115; 30/314, 376; 180/19.1
See application file for complete search history.

(56) References Cited

U.S. PATENT DOCUMENTS

| | | | | |
|---|---|---|---|---|
| 2,639,654 A | * | 5/1953 | Baunsgard et al. | 172/354 |
| D262,596 S | * | 1/1982 | Green | D8/11 |
| 5,287,935 A | * | 2/1994 | Foeller | 172/136 |
| 5,983,616 A | * | 11/1999 | Smitherman | 56/239 |

* cited by examiner

*Primary Examiner* — Robert Pezzuto
(74) *Attorney, Agent, or Firm* — Vidas, Arrett & Steinkraus, P.A.

(57) ABSTRACT

A multi-purpose dual blade tool with a hitch pin system that allows the operator to adjust the tool to serve as a sod cutter, scuffle hoe, or lightweight pick-ax which allows the operator to use the tool in an upright standing position. This tool is comprised of a base structure or assembly having points of attachment for a wheel or wheels, a cutting blade, an additional kick blade which mounts on a handle directly above the base structure or can be used independently as a lightweight pick ax, and a wooden handle with composite grip and multiple attachment holes.

13 Claims, 5 Drawing Sheets

MULTI-PURPOSE LANDSCAPING TOOL

STATEMENT REGARDING FEDERALLY SPONSORED RESEARCH OR DEVELOPMENT

There were no federal funds used in the development of this invention.

CROSS-REFERENCE TO RELATED APPLICATIONS

There are no prior applications or prior filed copending applications for this invention.

BACKGROUND OF THE INVENTION

This multi-purpose landscaping tool falls under classification 172 as an earth working tool, sub-classification 19, as an apparatus with a primary function of cutting sod, and sub-classification 329, an earth working element having a handle for manipulating and supporting it, and sub-classification 720, as an apparatus comprising an earth working blade, usually operating in a horizontal position, which operated below the surface of the ground to make a horizontal cut or to lift the soil and permit it to return to substantially the original position without any lateral shifting thereof.

The following table contains any prior art similar to this device but are generally used for different purposes.

| Patent # | Name | Year |
| --- | --- | --- |
| 05609213 | Sod Cutting Edger and Trencher | 1997 expired |
| 05983616-1 | Garden Tool for cutting weeds and . . . | 1999 expired |
| 01917333-1 | Wheel hoe | 1933 |
| 02988157 | Cultivator | 1961 |
| 01006758 | Lawn Edger Trimmer | 1911 |
| 00387333 | Cultivator | 1888 |
| 00161048 | Sod Cutter | 1865 |
| 01428581 | Wheel Hoe | 1922 |
| 02639654 | Scraper type cultivating tool | 1953 |
| 00045926 | Sod Cutter | 1865 |
| 1,157,809 | Trench Cutter and Edge Trimmer | 1915 |
| 1,180,783 | Device for trimming lawns | 1916 |
| 2,001,921 | Lawn Edger | 1935 |
| 1,693,808 | Lawn Edging Implement | 1928 |

SUMMARY OF INVENTION

The ROLLERHOE® brand multi-purpose tool offers users a unique apparatus that significantly improves current sod cutters or scuffle hoes through efficiency and flexibility of design. The ROLLERHOE® brand multi-purpose tool is designed for the professional landscaper or elite gardener. It combines the functionality of three separate tools (gardening hoe, sod cutter and pick ax) into one exceptionally strong, interchangeable tool which can be adjusted within seconds. Its ergonomic design reduces the amount of bending and lifting required during regular landscaping and gardening work while providing and effective tool that will stand up to years of heave use.

The ROLLERHOE® brand multi-purpose tool is an operator powered multi-purpose gardening and landscaping tool that can be used as a scuffle-style gardening hoe, sod cutter or pick ax. It is ergonomically designed to allow users to cut through sod using an upright body position and a sawing motion, with the additional utility of a kick blade for cutting through thick soil or tough sod. It quickly transforms into an exceptionally strong scuffle hoe with a double-edged hoe blade and wheel support. Finally, the kick plate and handle can be easily separated from the body of the tool to serve as lightweight pick ax.

DETAILED DESCRIPTION OF THE INVENTION

MATERIALS: The base of this tool is created from 1¾ inch stainless steel square tubing, ¼ inch steel plate, ⅛ inch steel plate, ⅜ inch steel plate, and a 5 inch diameter rubber or plastic wheel with a minimum width of 2¾ inches. ⅜ inch bolts and 2 inch hitch and cotter pins are used to fasten the pieces together. ⅝ inch diameter solid steel rod, 1 inch diameter PVC tubing, and steel cap nuts are also used.

Figure 1:
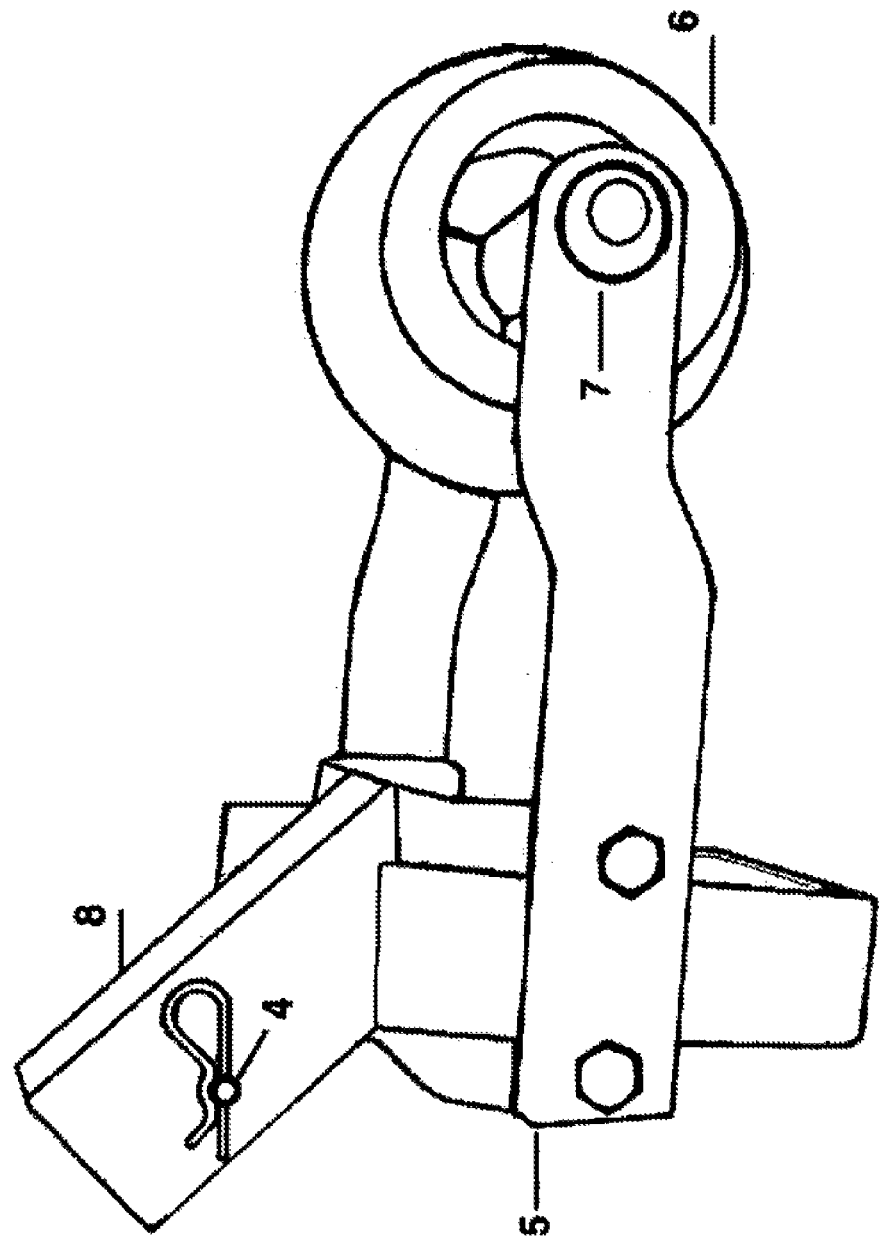
FIG. 1 is a side view of the base or main assembly of the ROLLERHOE® brand multi-purpose tool, including the cotter pin attachment (item 4), wheel supports (item 5), roller wheel (item 6), cap and pin used to attach the wheel (item 7), the handle shaft (item 8), and the U-shaped cutting blade (unmarked).

ASSEMBLY: The base shaft of the utility is created using the steel square tubing. The top end is cut off on square, and the bottom is cut at a forty-five degree angle such that the shortest side of the shaft is 3 inches long, and the longest side is 4¾ inches long. (See FIG. 1, #8) A ⅜ inch hole is drilled on the angle sides of the tubing, approximately 1½ inch from the squared end of the shaft. (See FIG. 1, #4)

A strip of steel plate that is 2¾ inches wide is used to create the base. The strip will be cut to a minimum length of 8 inches and would not exceed 16 inches. The plate is then bent at both ends to create a two inch lip on both ends. (see FIG. 2, #3) The shaft is then welded to the base using a continuous weld.

Figure 3:
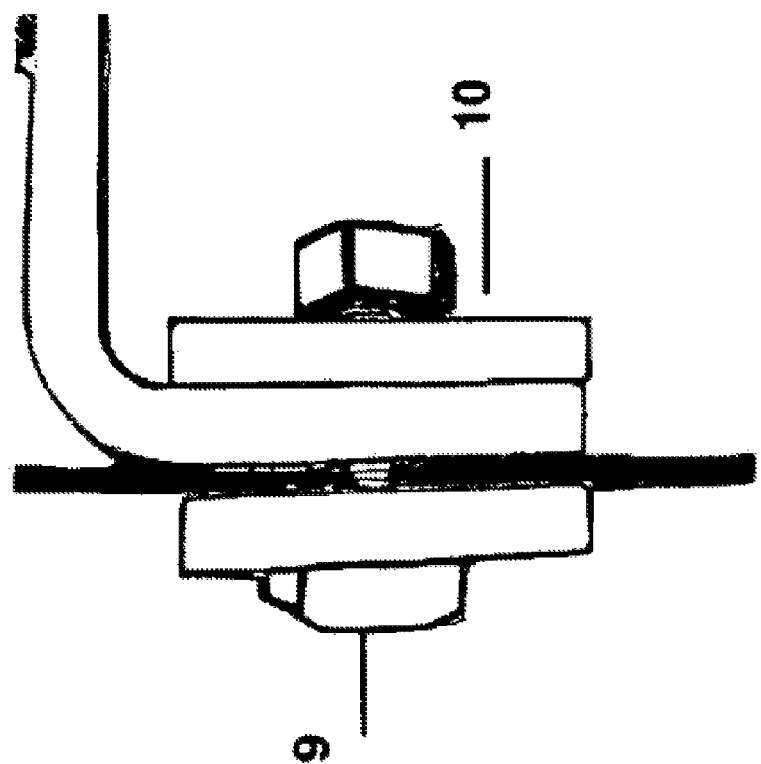
FIG. 3 is an expanded view of the blade pocket assembly including the bolt and nut (item 9) and the stabilization bracket (item 10), as well as a partial view of the blade and base assembly, which is unmarked.

A pocket for the blade is formed using additional steel plating to create wheel supports and brackets. (FIG. 1, #5, 7) The two wheel supports are made from strips of ¼ inch steel plate cut 1½ wide, and a minimum 9 inches long with two 30 degree angle bends to fit the wheel. Two rectangular brackets, 1½×2¾, with two ⅜ inch holes drilled 1¾ inches apart and centered on the bracket are placed on the inside or outside of the base for additional strength and functionality. (FIG. 3, #10)

The blade is created using a strip of ⅝ inch steel plate that is 1½ inches wide and a minimum of 14 inches long, to a maximum of 22 inches. The strip is beveled to a 45 degree angle on both of the long sides, and then bent at a 90 degree angle to create blade supports on each side that are 5 inches in length, creating a flat horizontal blade from 4 to 12 inches in width. The cutting depth of the blade may be varied by how high or low it is placed and secured within the blade pocket. (See FIG. 2, #2)

Figure 2:
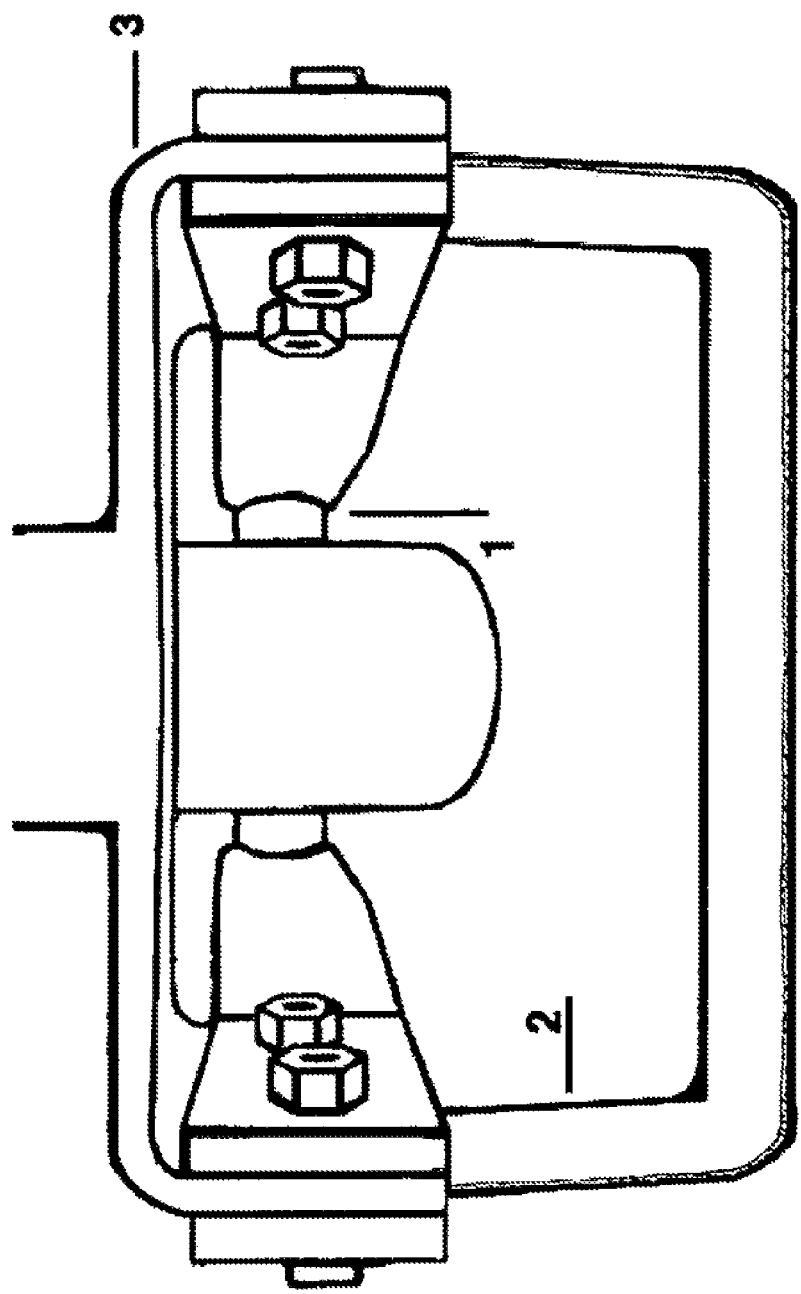
FIG. 2 is a rear view of the base or main assembly of the ROLLERHOE® brand multi-purpose tool, including a partial view of the wheel attachment pin (item 1), the u-shaped cutting blade (item 2), and the upper frame of the assembly (item 3).

A wheel or pair of wheels is attached using solid steel rod cut to a minimum length of 3 inches, to a maximum length of 10 inches, varying the length of the rod to match the wide of the cutting blade. (See FIG. 1, #6, 7) Washers created from 1 inch PVC pipe center the wheel between the supports, and steel cap nuts are used to secure the rod to the two supports on the outside. (FIG. 2, #1)

Figure 4:
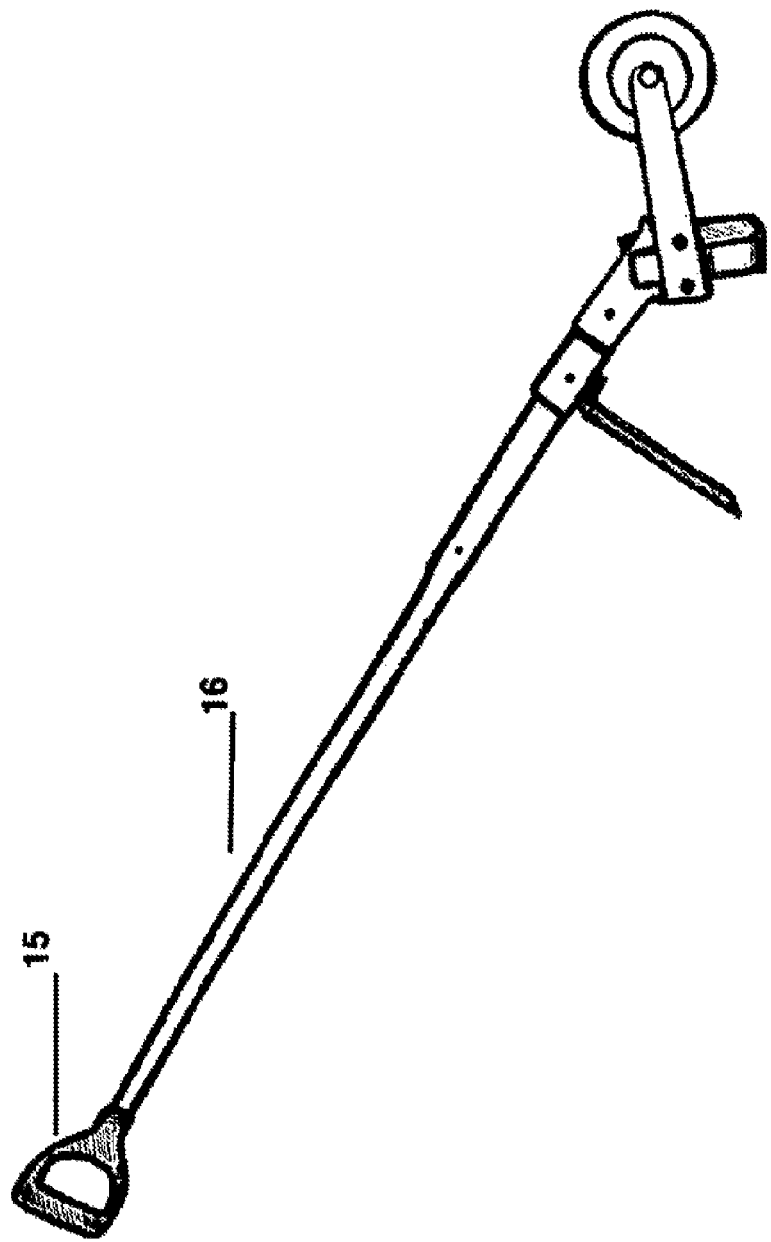
FIG. 4 is a side view of the fully assembled ROLLERHOE® brand multi-purpose tool including composite grip in a vertical position (item 15), and wooden handle (item 16).

A standard solid wood post hole digger handle with a composite grip attached at the top and a square base at the bottom is used for the handle and extension of the ROLLER-HOE® brand multi-purpose tool. One ⅝ inch hole is drilled 2 inches from the base to attach handle into shaft of the tool. A second ⅜ inch hole is drilled at 4¾ inches from base to a maximum of 17 inches from the base to attach the kick plate. (See FIG. 4, #15, 16) For flexibility of use, series of holes may also be drilled, to a maximum of four. Holes may be drilled to allow the kick plate to hang directly under the handle or to the side. Handle may also be attached to allow for a vertical or horizontal grip placement.

Figure 5:
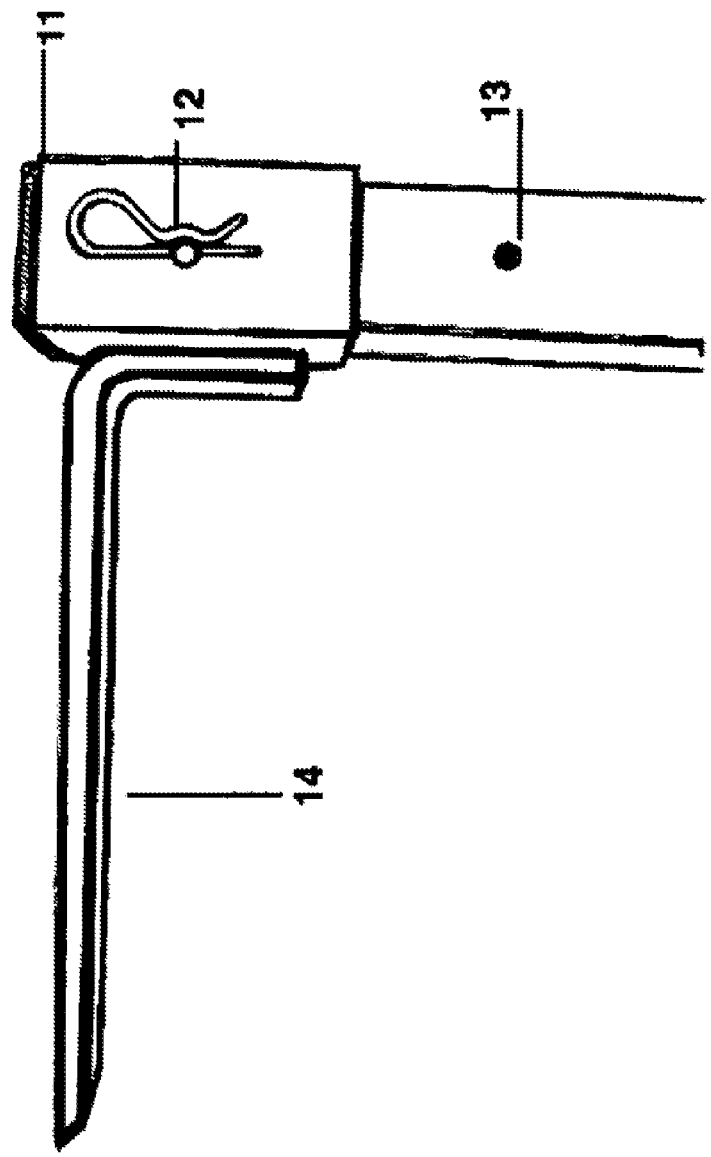
FIG. 5 is a side view of the kick blade detached from the rest of the assembly for use as a light weight pick ax. This diagram shows the body of the kick blade (item 11), along with the cotter and pin used to fix the blade in position (item 12), the wooden handle with adjustment holes (item 13) and the blade itself (item 14).

The kick blade is created using 3 inches of the steel square tubing, cut on square both ends at a 90 degree angle. (See FIG. 5, #11) A strip of ⅝ inch steel plate cut 1½ inches wide and a minimum of 10 inches long to a maximum of 12 inches long is used for the body of the kick plate. One of the narrow ends of the strip is beveled at a 45 degree angle to create a cutting edge, and the other end is bent at a 90 degree angle, creating a two inch support to be attached to the steel tubing. The kick plate is then attached to the section of steel tube using a continuous weld on all four sides. A ⅜ inch hole is centered and drilled through two sides of the steel tubing to allow the steel plate to be attached to the handle using a hitch and cotter pin. The kick plate can be attached below the handle or to the side of the handle.

The invention claimed is:

1. A multi-purpose dual blade tool with a hitch pin system that allows the operator to adjust the tool to serve as a sod cutter, scuffle hoe, or lightweight pick-ax, the hitch pin system comprising a first hitch pin and a second hitch pin, the multi-purpose dual blade tool comprising:
   a. a base structure;
   b. a kick blade having only one sharpened edge at an end;
   c. a wooden handle with a composite grip at a first end, and multiple attachment holes;
   d. a hoe blade having two sharped edges opposite one another; and
   e. a wheel;
   wherein the wheel and hoe blade are secured to the base structure with the hoe blade being positioned behind the wheel; the base structure is releasably secured to a second end of the handle by the first hitch pin; and the kick blade is secured to the handle by the second hitch pin, the kick blade being positioned behind the hoe blade.

2. The multi-purpose tool of claim 1, wherein the hoe blade is U shaped.

3. The multi-purpose tool of claim 1, wherein the kick blade is adjustable and extends from the handle at a 90 degree angle.

4. The multi-purpose tool of claim 1 wherein the wheel is a single wheel.

5. The multi-purpose tool of claim 1, wherein the wheel comprises a first wheel and a second wheel.

6. The multi-purpose tool of claim 1, wherein the base structure, the kick blade, and the hoe blade are made of steel.

7. The multi-purpose tool of claim 1, wherein the handle has a round upper section and a square base section, and the base structure and the kick blade are secured to the square base section.

8. A multi-purpose landscaping tool comprising:
   a handle comprising:
      an upper round section with a grip at a first end of the handle;
      a lower square base section, the square base section comprising a first hole and a second hole separated from one another, the second hole being closer to a second end of the handle than the first hole;
   an adjustable kick blade secured to the first hole, the kick blade having body with a sharp end beveled at a 45 degree angle, the body extending from the handle at a 90 degree angle;
   a base structure releasably engaged to the second hole, the base structure comprising:
      a square tubular shaft with a square first end and an angled second end;
      a base portion secured to the square tubular shaft, the base portion having two arms shorter than a length of a body extending between the two arms;
      wheel support brackets, each wheel support bracket comprising a first end secured to the base portion, and a second end;
      wherein the base portion and the wheel support brackets form a pocket;
   a cutting blade secured to the base portion of the base structure adjacent to the first ends of the wheel support brackets and inside the pocket formed by the base portion and the wheel support brackets, the cutting blade being U-shaped with two cutting edges beveled at a 45 degree angle; and
   a wheel secured to the second ends of the wheel support brackets.

9. The multi-purpose landscaping tool of claim 8, wherein the handle and the kick blade form a pick ax unit of the tool.

10. The multi-purpose landscaping tool of claim 8 wherein the handle is made of wood; and the kick blade, the base structure, and the cutting blade are made of steel.

11. The multi-purpose landscaping tool of claim 8, wherein the wheel is a single wheel.

12. The multi-purpose landscaping tool of claim 8, wherein the wheel comprises a first wheel and a second wheel.

13. The multi-purpose landscaping tool of claim 8, wherein the kick blade is secured to the first hole of the square base section by a first hitch pin, and the base structure is secured to the first hole of the square base section by a second hitch pin.

* * * * *